United States Patent
Shigetomi (10) Patent No.: US 6,169,568 B1
(45) Date of Patent: Jan. 2, 2001

(54) LIQUID CRYSTAL DISPLAY DEVICE AND ENTERTAINMENT SYSTEM

(75) Inventor: Tetsu Shigetomi, Kanagawa (JP)

(73) Assignee: Sony Corporation, Tokyo (JP)

(*) Notice: Under 35 U.S.C. 154(b), the term of this patent shall be extended for 0 days.

(21) Appl. No.: 08/762,724

(22) Filed: Dec. 10, 1996

(30) Foreign Application Priority Data

Dec. 14, 1995 (JP) .................................................. 7-347238

(51) Int. Cl.[7] .................................................... H04N 7/10
(52) U.S. Cl. .............................. 348/8; 348/563; 348/564; 348/588; 345/173
(58) Field of Search .................................... 348/553, 563, 348/564, 569, 588, 589, 600, 601, 8, 581; 345/115, 173

(56) References Cited

U.S. PATENT DOCUMENTS

| | | | | |
|---|---|---|---|---|
| 5,287,189 | * | 2/1994 | Ersoz et al. | 348/588 |
| 5,311,302 | * | 5/1994 | Berry et al. | 348/14 |
| 5,398,074 | * | 3/1995 | Duffield et al. | 348/564 |
| 5,404,567 | * | 4/1995 | DePietro et al. | 455/6.3 |
| 5,442,406 | * | 8/1995 | Altmanshofer et al. | 348/588 |
| 5,481,315 | * | 1/1996 | Matsunaga | 348/565 |
| 5,552,806 | * | 9/1996 | Lenchik | 345/156 |
| 5,600,365 | * | 2/1997 | Kondo et al. | 348/8 |
| 5,657,246 | * | 8/1997 | Hogan et al. | 348/15 |
| 5,710,601 | * | 1/1998 | Marshal et al. | 348/564 |
| 5,717,878 | * | 2/1998 | Sannino | 345/327 |
| 5,760,819 | * | 6/1998 | Sklar et al. | 348/8 |
| 5,790,175 | * | 8/1998 | Sklar et al. | 348/8 |
| 5,808,660 | * | 9/1998 | Sekine et al. | 348/7 |
| 5,847,771 | * | 12/1998 | Cloutier et al. | 348/564 |
| 5,848,367 | * | 12/1998 | Lotocky et al. | 701/36 |

* cited by examiner

Primary Examiner—Michael Lee
Assistant Examiner—Linus H. Lo
(74) Attorney, Agent, or Firm—Jay H. Maioli (57) ABSTRACT

An entertainment system wherein a video image and an image containing icons, both having an aspect ratio of 4:3, are displayed on a display screen with an aspect ratio of 16:9 in such a manner that they do not overlap each other. This enables the user to enjoy a clean video image even if dirt from the fingers is left on the touch panel containing the icons disposed on the display screen. Additionally, there is no concern of image quality deterioration, because the source video image is an image with an aspect ratio of 4:3 and is displayed without changing this aspect ratio. The entertainment system includes a scaler to compress a video image with a 4:3 aspect ratio in the horizontal direction, an icon generator that generates icons in a horizontally compressed manner, a mixer to combine the compressed video image with the compressed icons, an NTSC (National Television Standards Committee); and encoder to convert the digital signal into an analog one, and an LCD with circuitry to expand the the combined image to a 16:9 aspect ratio.

1 Claim, 7 Drawing Sheets

FIG. 7A Data

FIG. 7B Strb

FIG. 7C Data ^ Strb (DELAYED)

LIQUID CRYSTAL DISPLAY DEVICE AND ENTERTAINMENT SYSTEM

BACKGROUND OF THE INVENTION

The present invention relates to a liquid crystal display device that is part of an entertainment system. More particularly, the display device is useful in circumstances where installation space is limited, for example, in an aircraft environment.

Currently, efforts are being made to put into practical use a video distribution system that will allow a user to view a video program whenever the user wishes, hereinafter called the "video-on-demand system". Presently, video-on-demand systems are being developed to connect a delivery center for distributing video programs to a personal home, and development of these systems is being expedited because of their potential application in passenger aircraft where it would lead to great service improvements for the passengers.

When designing video-on-demand systems it is desirable to integrate input devices such as operation keys in the display device to effectively utilize the limited space that is available. For example, an approach is to create an image representing icons, and operation keys and display it on the display screen. The icons, and operation keys can be manipulated using a touch panel display. Using a first approach, the icons and operation keys can be overlayed on a video image, or using a second approach, the video image can be reduced, and the icons displayed in the empty space left after the video image is reduced in size.

When using this first approach, however, the icons can obscure the video image in some areas, so this approach is not suitable for displaying icons or operation keys which need to be constantly displayed. Additionally, the screen at the areas where the icons or operation keys are usually displayed becomes dirty from the fingers touching the screen, making the video image difficult to see even in the case when the display of the icons is temporary. In the second approach, since the video image is horizontally reduced and displayed in a display screen with aspect ratio of 4:3, the deterioration of the image quality is unavoidable due to distortion caused by such video image compression in the horizontal scanning direction.

SUMMARY OF THE INVENTION

The present invention is made to overcome the above problems and consists of a liquid crystal display device with a touch panel, and an entertainment system using the liquid crystal display device.

It is an object of the present invention to display a video image simultaneously with an icon image both of which have an aspect ratio of 4:3 side by side on a display screen with aspect ratio of 16:9.

It is another object of the present invention to prevent the video image from being difficult to see due to dirt and grease from the fingers operating the touch panel of the display screen.

According to an aspect of the present invention an entertainment system includes a transmitting unit and several receiving units connected to the transmitting unit through a communication line. The transmitting unit reads a video image from a storage section, the video image being obtained by compressing and encoding a video image provided with an aspect ratio of 4:3, and each of the receiving units includes a liquid crystal display device with a display screen having an aspect ratio of 16:9 and on which a touch panel is disposed. The liquid crystal display device includes an image output section for displaying the video image and several icon images, wherein the video image and the icon images have the same aspect ratio of 4:3 as that of a source image, and wherein the video image and the icon images are displayed on the display screen with an aspect ratio of 16:9 in a manner that the video image and the icon images are arranged side by side without overlapping.

The above and other objects, advantages and features of the invention will become apparent to those skilled in the art upon consideration of the following description of the invention.

DETAILED DESCRIPTION OF THE INVENTION

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawing.

Figure 1:
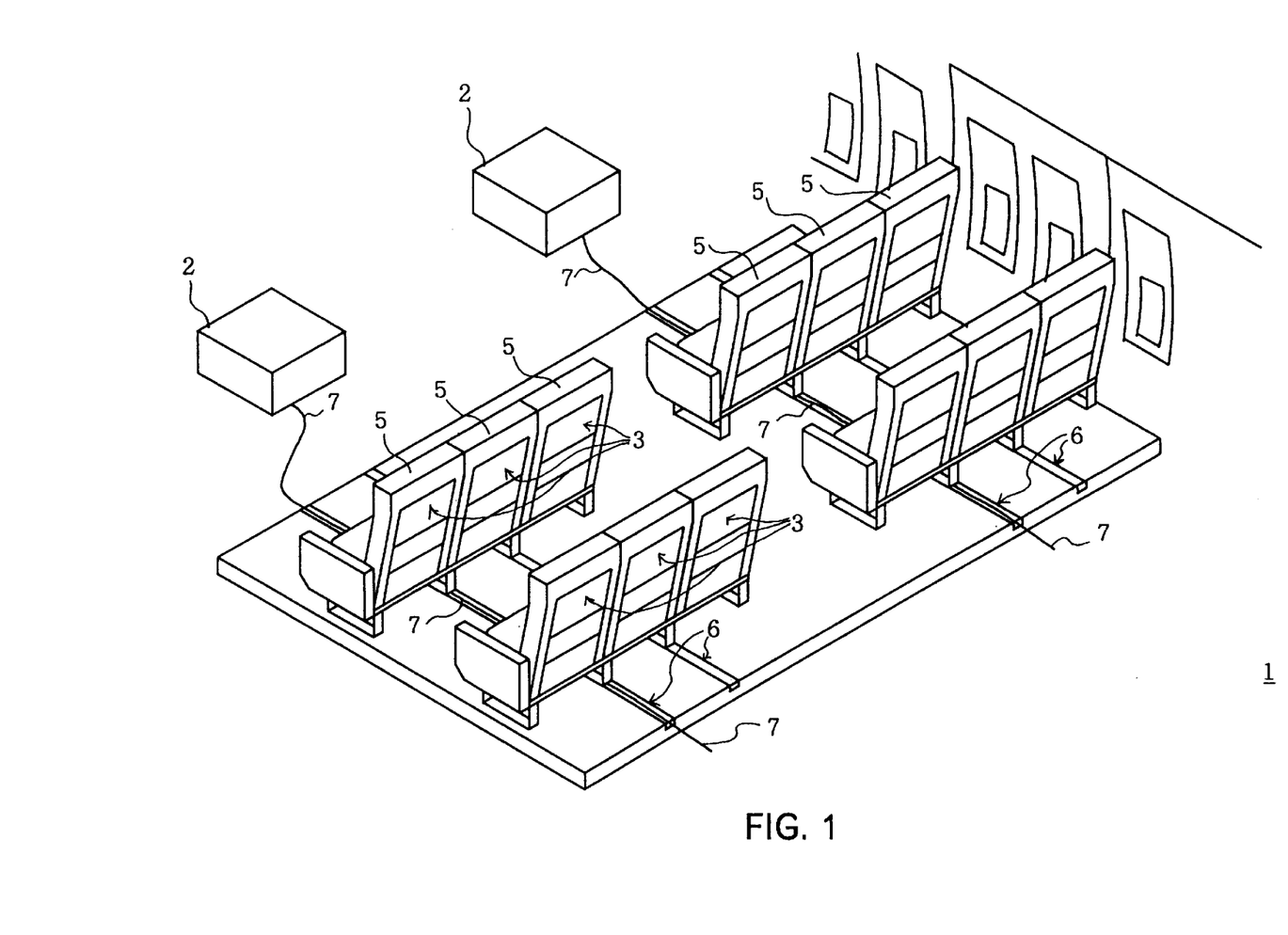
FIG. 1 is a perspective view showing an entertainment system according to am embodiment of the present invention.

Turning now to FIG. 1, a basic system configuration of a video-on-demand system in an aircraft is shown as an example of an entertainment system. This video-on-demand system provides video and audio programs to passengers in the cabin of an aircraft where groups of three seats in a row are arranged along each side of an aisle. The system is of relatively small scale consisting of fifty to sixty receiving units connected to one transmitter.

Figure 2:
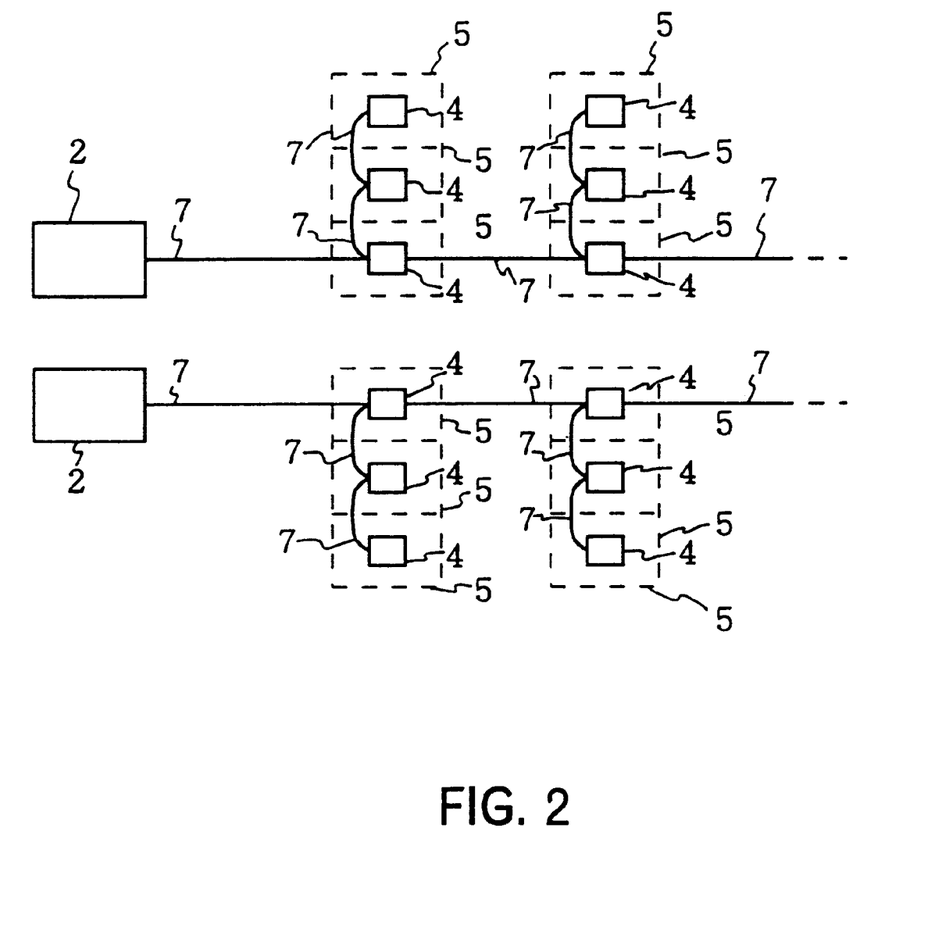
FIG. 2 is a schematic in block diagram form showing a network configuration used in the entertainment system according to an embodiment of the present invention.

As shown in FIGS. 1 and 2, a video-on-demand system 1 includes a transmitting unit 2 for transmitting a video program over a transmission path 7 based on a passenger request, and a receiving unit 4 for receiving the selected video program from those transmitted over the transmission path 7 and for displaying the video program on a liquid crystal display device 3. The liquid crystal display device 3 is mounted on the the back of each seat so that the passenger on the seat behind can view it, and each display device 3 has an aspect ratio of 16:9. The receiving unit 4 can be conveniently positioned under each seat 5.

The video-on-demand system 1 uses a system for transmitting information having a bidirectional serial transmission standard described later and is arranged to longitudinally connect the receiving units 4, thereby simplifying the network configuration of the system.

This simplified system is achieved by using one transmission path serially extending from a seat of the front row to a seat of the rear row through the receiving units 4 along a guide groove 6 mounted under the floor of each seat, and one transmission path serially extending from the receiving unit 4 of a seat 5 at one end of each row to the corresponding receiving unit 4 at the other end of the row.

When a transmission cable 7 is installed in the guide groove 6 as described, it is not necessary to bundle and install a number of transmission cables 7. This transmission cable design reduces the space needed by the network making the system design easier.

Since it is necessary only to build two types of transmission cables 7, one with a length to connect the receiving units 4 on the same row at equal intervals, and one with a length to connect the receiving units 4 between rows, it is possible to reduce building and maintenance costs while improving overall system reliability.

In addition, because of this modular design, even when the layout is changed to increase or decrease the number of seats, it is only required to connect or disconnect one transmission cable 7 from the receiving unit 4 of the added or deleted seat 5, simplifying the operations needed to increase or decrease the number of seats, thereby reducing the installation time.

Figure 3:
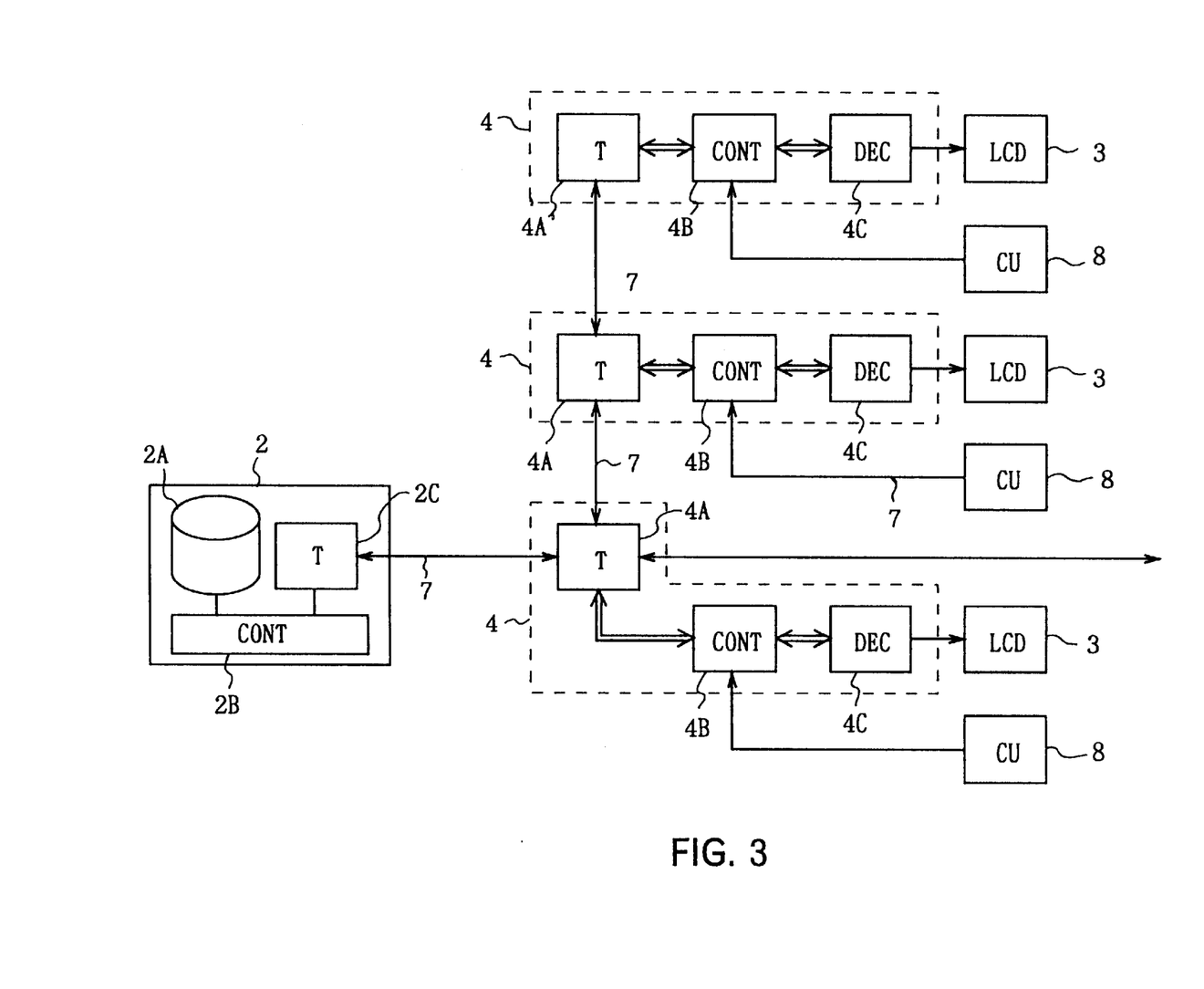
FIG. 3 is a schematic in block diagram form showing the internal configuration of the transmitting and receiving units according to an embodiment of the present invention.
Figure 4:
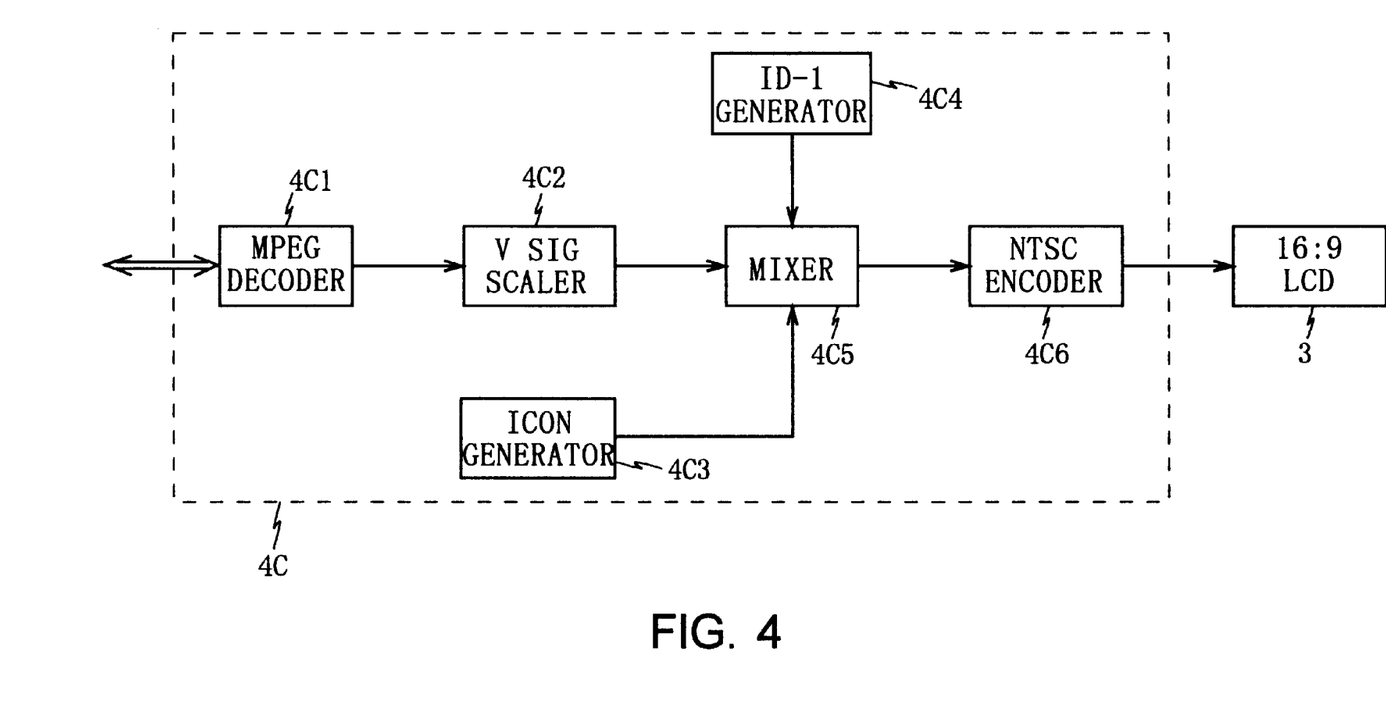
FIG. 4 is a schematic in block diagram form showing the decoder according to an embodiment of the present invention.

Turning now to FIG. 3 and FIG. 4, the arrangement of each section constituting the video-on-demand system 1 will be explained in detail. The transmitting unit 2 functions as a server and includes a storage device 2A consisting of a large capacity, hard disk drive, a controller 2B for controlling the harddisk, and a transceiver 2C for transmitting and receiving data in a serial transmission standard described below.

The storage device 2A stores several types of video programs, so that the various requests from the large number of passengers can be met. These video programs are stored in three types of formats, still picture (JPEG), normal video (MPEG 1), and high definition video (MPEG 2), so that the type of image can be changed according to the type of receiving unit connected to the network or according to passenger demand. In this embodiment all images are output in an aspect ratio of 4:3.

Additionally, the controller 2B is designed to control the operation of reading the storage device 2A based on a request from each receiving unit 4 received through the transceiver 2C. The controller 2B packets a video program read-out from the storage device 2A based on the request, and appends a header to each packet for output to the transceiver 2C.

The transceiver 2C transmits and receives information at 100, 200, or 400 MBps according to the transmission rate allowed by the network system design.

Further, the receiving unit 4 mounted at each seat 5 includes a transceiver 4A for receiving the video program transmitted from the transmitting unit 2, a controller 4B for extracting the information program from the received video programs, and a decoder 4C for decoding the extracted information program and converting it into video signals for display to the passenger.

Here, the controller 4B is connected to a control unit 8 consisting of a touch panel, and is designed to send a command corresponding to an instruction entered through the control unit 8 as control data to the transmitting unit 2.

The decoder 4C has an arrangement as shown in FIG. 4, wherein an MPEG decoder 4C1 is a circuit for expanding compressed and coded data input to the decoder 4C, and decoding it into digital image data. The decoded data is sent to a video signal scaler 4C2. The aspect ratio of the video image at this stage remains 4:3.

The video signal scaler 4C2 is a circuit for changing the aspect ratio of the image by thinning out, or compressing, the video image in the horizontal direction. This thinning-out processing is in the same ratio as when an image provided in an aspect ratio of 16:9 is compressed to an image with an aspect ratio of 4:3 in the horizontal scanning direction. This converts the video image decoded by the MPEG decoder 4C1 into a smaller image and creates an area where images such as icons and operation keys can be inserted.

An icon generator circuit 4C3 is a circuit for generating icons representing operation keys, messages, or the like. Examples of these are a select mode key, a determination key, a delete key, a call key, a cancel call key, a light lamp key, and a no-smoking sign. The icon generator circuit 4C3 generates vertically deformed icons for the later processing and expansion in the horizontal scanning direction. That is, the icon generator circuit 4C3 generates an image that is restored to the original, undeformed, picture when the image with an aspect ratio of 4:3 is enlarged to one with an aspect ratio of 16:9 in the horizontal scanning direction.

An ID-1 generator 4C4 is a circuit for generating ID-1 data in the wide mode. The ID-1 data has been conventionally used as standard data for automatically expanding an image with aspect ratio of 4:3 to one with aspect ratio of 16:9.

Figure 5:
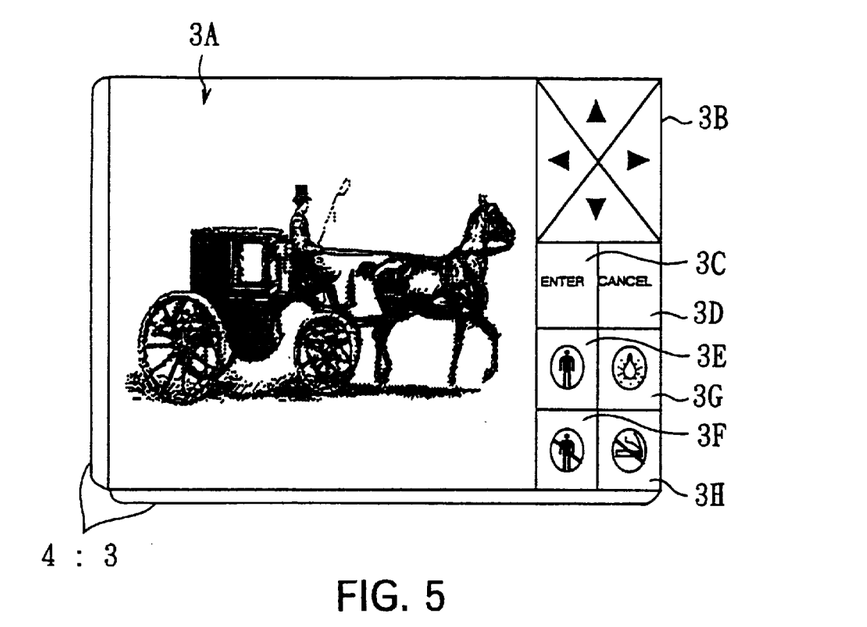
FIG. 5 is a diagram showing the image output by the decoder shown in FIG. 4.

A mixer 4C5 consists of a frame memory and performs a mixing operation by embedding a video image on the left area of the screen of the frame memory, the icon data on the right area of the screen, and the ID-1 data in the blanking interval area. This generates an NTSC (National Television Standards Committee) input image as shown in FIG. 5, where the compressed picture of a carriage is shown as a video image 3A, and a select mode icon 3B, a determine mode icon 3C, a cancel mode icon 3D, a call crew icon 3E, a cancel call crew icon 3F, a light lamp icon 3G, and a no smoking icon 3H are displayed also in a compressed format.

The NTSC encoder 4C6 encodes the image signal processed by the mixer 4C5, and outputs it to the liquid crystal display device 3. The aspect ratio of the image continues to be 4:3 at the output stage of the NTSC encoder 4C6.

Figure 6:
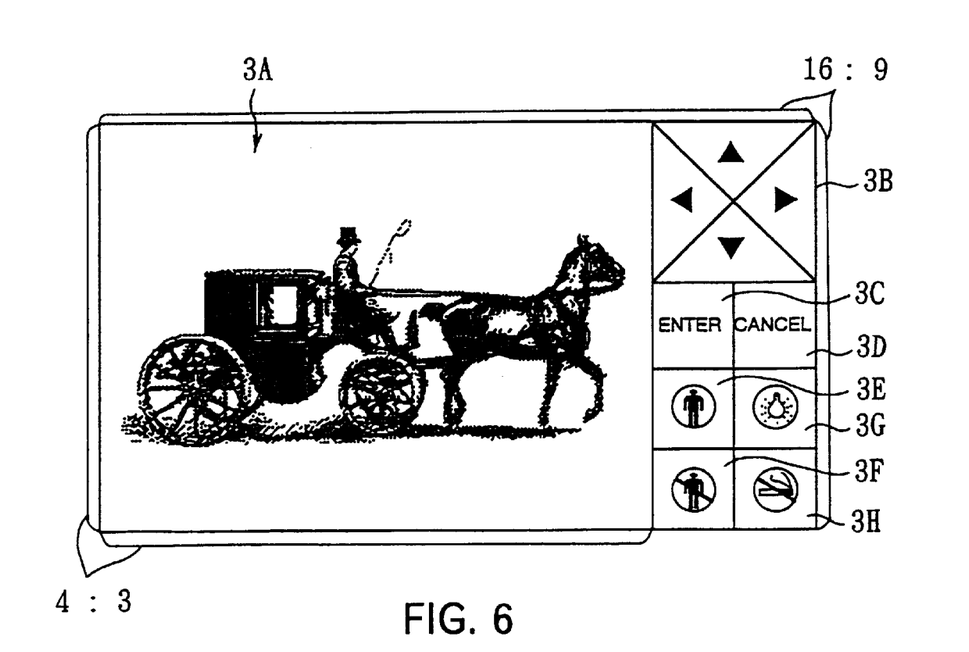
FIG. 6 is a diagram showing the final image displayed on the liquid crystal display device with an aspect ratio of 16:9 according to an embodiment of the present invention.

Next, the process for converting the image to one with an aspect ratio of 16:9 as shown in FIG. 6 is performed within the liquid crystal display device 3. The liquid crystal display device 3 contains a functional circuit, not shown, for detecting the ID-1 data from the blanking signal section of the input image signal. When the ID-1 data is detected by the functional block, it automatically expands the image with an aspect ratio of 4:3 to an image with an aspect ratio of 16:9.

Thus, the video image with an aspect ratio of 4:3 is displayed on the screen of the liquid crystal display device 3, and the icons are arranged and displayed in a region not overlapping the image display region.

Next, the bidirectional serial transmission standard used for the video-on-demand system 1 is described. The bidirectional serial transmission standard used for the video-on-demand system 1 requires a transmission cable 7 having three lines, a supply line, a data line, and a strobe line, and is designed to transmit and receive data at transmission rates of at least 100 MBps. In this embodiment the transmission cable 7 is designated to select from three transmission rates: 100 MBps, 200 MBps, and 400 MBps.

The supply line of the transmission cable 7 is a line for supplying DC power to all the equipment connected to it, and is designed with enough capacity so that when the layout is changed, for example, to increase the number of seats no additional power capacity is needed. The supply line enables the transmission cable 7 to always use the system in the active state, even when using a relay unit, and to transmit the video programs without considering reflection or interference from the receiving unit 4.

Figures 7A, 7B:
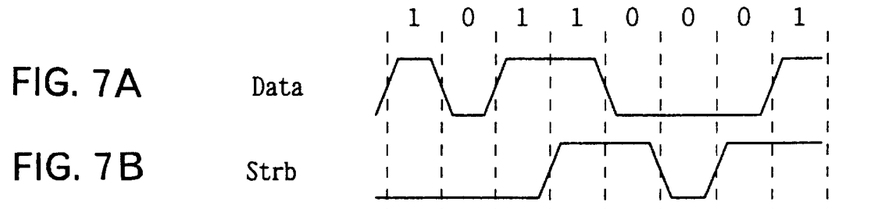
FIG. 7 shows signal waveforms representing the bidirectional serial transmission standard used by the entertainment system according to an embodiment of the present invention.

The data line is used for transmitting the video program data and is designed to serially transmit NRZ-coded data, as shown in FIG. 7 (A).

Figure 7C:
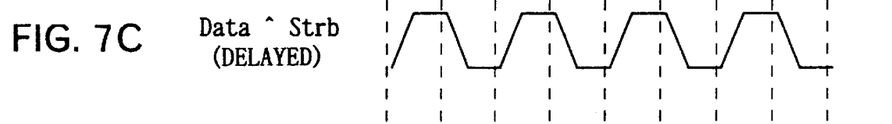

The strobe line is used for transmitting a signal as shown in FIG. 7 (B), when two contiguous bits in the NRZ data are at the same state, and is designed, as shown in FIG. 7 (C), to be able to reproduce a clock signal at the receiving unit side by exclusive ORing the strobe signal transmitted through this line with the NRZ data. This enables the data line to transmit the data free from error without depending on transmission delays.

Figure 8A:
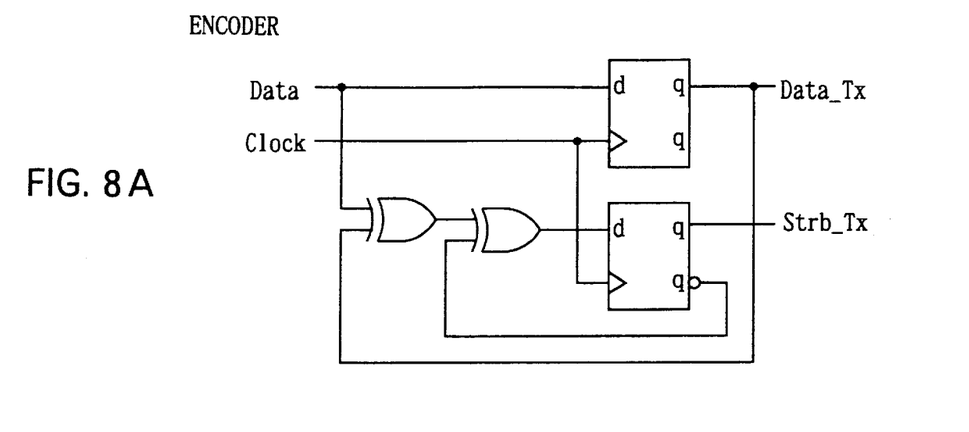
FIG. 8 is a schematic showing a configuration of an encoder and a decoder according to an embodiment of the present invention.
Figure 8B:
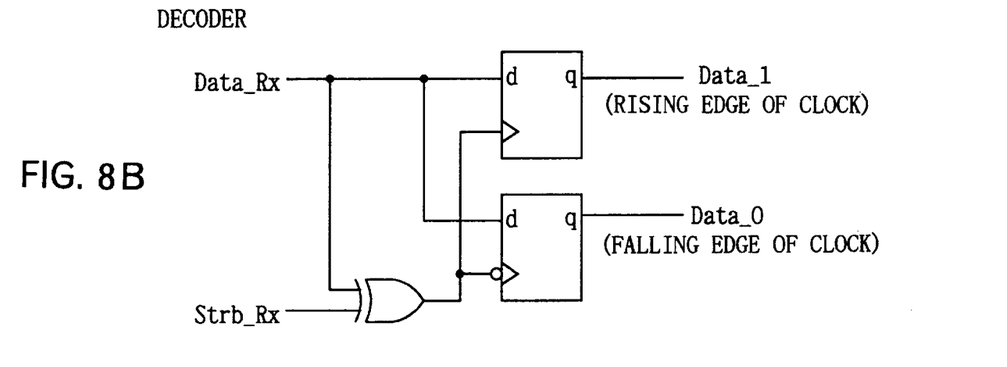

FIG. 8 (A) shows an encoder for outputting NRZ data and a strobe signal from an input clock signal and NRZ data, while FIG. 8 (B) shows a decoder for decoding the NRZ data and the clock signal from the NRZ data and the strobe signal.

The communication protocol employed in the bidirectional serial transmission standard will be described next. The bidirectional serial transmission standard is designed to divide one second into 8,000 transmission intervals, hereinafter called "one cycle", and to use a predetermined interval at the beginning of each cycle as the interval for distributing video programs from the transmitting unit 2 to each receiving unit 4, and to assign the next predetermined interval as the interval for receiving a request signal from the receiving unit 4 to the transmitting unit 2.

Figure 10A:
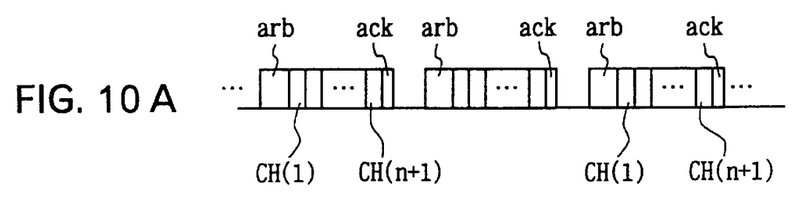
FIG. 10 is a schematic diagram showing a data transmission protocol according to an embodiment of the present invention.
Figure 10B:
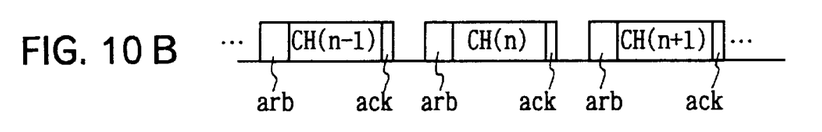

There are two modes of use of the one cycle interval. The first is to time-divisionally transmit program information for each receiving unit 4 by uniformly dividing the one cycle interval into sub-intervals in which program information can be transmitted from the transmitting unit 2 to the receiving unit 4, and assigning each uniformly divided sub-interval to one of the receiving units 4. This transmission mode is shown in FIG. 10 (A). Here, although each sub-interval is assigned a number from 1 to 39, because 39 receiving units 4 are connected to the transmitting unit 2, the duration of each sub-interval will vary according to the number of connected units. The second mode shown in FIG. 10 (B) uses the entire one cycle interval in which the program information can be transmitted from the transmitting unit 2 to the receiving unit 4 to sequentially transmit program information for each receiving unit in that interval.

In either case, the standard is designed to use the top interval of each cycle for transmitting the cycle start data which indicates the beginning of the cycle, and to use the following predetermined interval, represented by "arb" in FIGS. 10(A) and 10(B) for assigning usage of the transmission cable 7 or the single interrupt request line, in order of priority. It is also designed, so that at the completion of the interval in which the program information is transmitted end data is transmitted indicating completion of transmission of the program information.

Figure 9A:
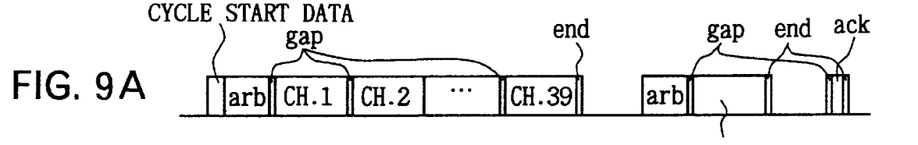
FIG. 9 is a schematic diagram showing the data structure of one cycle.

A narrow interval provided between each sub-interval in the transmission state, as shown in FIG. 9 (A), is a non-transmission interval and is not used for communication purposes.

Figure 9B:
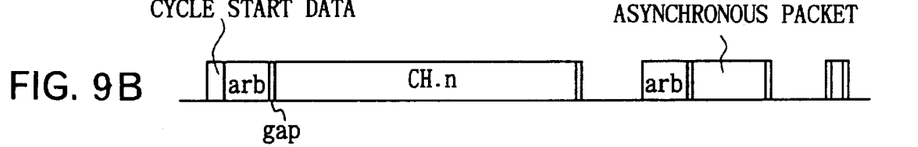

The interval in one cycle for accepting a request signal sent from the receiving unit 4 to the transmitting unit 2 is of the same structure for both modes. The first interval, represented by "arb" in FIGS. 9(A) and 9(B) is initially used for assigning the usage right of the transmission cable 7 in order of priority to prevent several transmission requests from conflicting.

At the completion of this interval, a request signal is transmitted as an asynchronous packet from each receiving unit 4, so that end data is sent at the completion of transmission. At the end of one cycle interval, an acknowledgment response interval (ack) is generated to inform the receiving unit 4 of the fact that the transmitting unit 2 has received the data without error. The transmitting unit 2 is designed to transmit serial data under the above described protocol.

When the power supply for the entire system is turned on, the video-on-demand system 1 performs initialization to allocate IDs for each receiving unit 4 by utilizing an ID appending function (Self ID function). After the IDs are allocated, the video-on-demand system 1 is in a state where a video program can be transmitted from the transmitting unit 2, and an image as shown in FIG. 6 is displayed on the liquid crystal display device 3 of each seat 5. At this stage a video image with the same aspect ratio as that of the image signal output from the transmitting unit 2 (4:3) is displayed on the liquid crystal display device 3 that has an overall aspect ratio of 16:9.

Since the icons are displayed in an area separate from the video image, the video image, and the icons can be easily viewed and operated without spoiling the image area.

The passenger instructs a change in the display mode by operating the control unit 8, or touch panel. While there are various display modes including a mode for selecting a video channel program, a mode for selecting a music channel program, and a TV shopping mode, the following discussion assumes that the display mode selected is a video channel program.

When the passenger selects a channel, his or her selection information is sent to the controller 4B of the receiving unit 4, and to the controller 2B of the transmitting unit 2 through the transceiver 4A, as shown in FIG. 3.

The controller 2B reads from the storage device 2A a video program corresponding to the request signal sent from the controller 4B, and sends it to the receiving unit 4 through the transceiver 2C. If there are several passengers requesting video programs, a video program for each passenger is time-divisionally transmitted.

The data received by the transmission cable 7 is received and decoded by the decoder 4C of each receiving unit 4 and displayed on the liquid crystal display device 3 installed in front of the seat in front of the passenger selecting the program. If the passenger desires to fast forward or pause the video program, he need only press with a finger the applicable icon area during the video program. This operation by the passenger is received by the controller 4B through the control unit 8, including a touch panel, and sent to the transmitting unit 2.

The above embodiment of the present invention provides a video-on-demand system with images of high quality, which are not hidden by the icons or the like, while responding to different requests from a number of passengers. Additionally, a system with higher flexibility than the previous designs is achieved because, when the user interface is modified or its specification changed, the change can be accommodated by modifying the icons or the like in software.

While the above embodiment is applied to a video-on-demand system of relatively small scale directly connecting the transmitting unit 2 and the receiving units 4, the present invention is not limited to such arrangement and can be applied to a video-on-demand system of large scale in which a number of transmitting units 2 are connected to the receiving units 4 through ATM switches and converters.

Further, while the above embodiment has been described where the video programs stored in the storage device 2A contained in the transmitting unit 2 are stored in one of three types of formats, still format (JPEG), normal format (MPEG 1), and high definition format (MPEG 2), the present invention is not limited to this, and the images could be stored in more than one of these formats.

Further, while the above embodiment has been described where a video-on-demand system is installed on an airplane, the present invention is not limited to this application, but can be applied to a case where a video-on-demand system is installed in a mobile body such as a ship, bus, or passenger car. Additionally, it is not limited to a mobile body, but can be widely applied where a video-on-demand system is desired, for example, in lodging facilities.

Further, while the above embodiment has been applied to a case where both image and audio signals are transmitted as a video program on a transmission path, the present invention is not limited to this case but can be widely applied to a system which distributes only image or audio signals.

Moreover, while the above embodiment has been described for a case where the decoder 4C and the liquid crystal display device 3 are separate devices, the present invention is not limited to this but can be applied to an arrangement where the decoder 4C is integrated into the liquid crystal display device 3.

Additionally, while the above embodiment has been described for a case where the decoder 4C is constructed as shown in FIG. 4, the present invention is not limited to this construction but can be applied to a case where video images and icons, both of which are provided with an aspect ratio of 4:3, are combined in a frame memory corresponding to an aspect ratio of 16:9, and the combined image is displayed as is.

Also, while the above embodiment has been described for a case where the video image is on the left side of the screen, and the icons are on the right side of the screen, the present invention is not limited to such case, and the arrangement may be reversed.

Thus, it is apparent that in accordance with the present invention an apparatus that fully satisfies the objectives, aims, and advantages is set forth above. While the invention has been described in conjunction with specific embodiments, it is evident that many alternatives, modifications, permutations, and variations will become apparent to those skilled in the art in light of the foregoing description. Accordingly, it is intended that the present invention embrace all such alternatives, modifications and variations as fall within the scope of the appended claims.

What is claimed is:

1. A video entertainment system, comprising:

a transmitting unit for transmitting coded video signals, including:
   a storage device for storing images;
   a transceiver; and
   a controller for controlling said storage device and said transceiver;

a communication line connected to the transmitting unit and installed in a guide groove;

a plurality of receiver units, each receiver unit connected to one of the communication line and to another receiver unit that is connected to the communication line, each receiver unit including:
   a decoder for decoding said coded video signals from said transmitting unit into decoded digital image data;
   a scaler for compressing said decoded digital image data into compressed digital image data and an empty space;
   an icon generator for generating compressed icons;
   an ID-1 generating circuit for generating ID-1 data defining a wide TV display format;
   a mixer with a frame memory for generating a mixed signal by embedding said compressed digital image data in a first area of said frame memory, for embedding said compressed icons in a second area of said frame memory corresponding to said empty space, and for embedding said ID-1 data in a blanking signal area of said frame memory;
   an encoder for encoding said mixed signal into an analog video signal for display; and a display unit including means for detecting said ID-1 data in said blanking signal section of said analog video signal for expanding said analog video signal to said wide TV display formats, wherein said compressed icons represent operation keys for use on a touch panel disposed on a display screen, said operation keys to be depressed by a user.

* * * * *